United States Patent
Ju et al.

(10) Patent No.: US 10,361,992 B2
(45) Date of Patent: Jul. 23, 2019

(54) METHOD FOR SYNCHRONIZING VIRTUAL MACHINE LOCATION INFORMATION BETWEEN DATA CENTER GATEWAYS, GATEWAY, AND SYSTEM

(71) Applicant: Huawei Technologies Co., Ltd., Shenzhen (CN)

(72) Inventors: Wenbin Ju, Nanjing (CN); Daolong Zhou, Nanjing (CN); Lingling Ji, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 15/606,859

(22) Filed: May 26, 2017

(65) Prior Publication Data
US 2017/0264587 A1 Sep. 14, 2017

Related U.S. Application Data (63) Continuation of application No. PCT/CN2015/081801, filed on Jun. 18, 2015.

(30) Foreign Application Priority Data

Nov. 26, 2014 (CN) .......................... 2014 1 0693597

(51) Int. Cl.
*H04L 12/46* (2006.01)
*H04L 29/12* (2006.01)
(Continued)

(52) U.S. Cl.
CPC ........ *H04L 61/103* (2013.01); *G06F 9/45558* (2013.01); *H04L 12/46* (2013.01);
(Continued)

(58) Field of Classification Search
CPC ............... H04L 61/103; G06F 9/45558; G06F 2009/45595
See application file for complete search history.

(56) References Cited

U.S. PATENT DOCUMENTS 9,590,824 B1 * 3/2017 Sikand ................ H04L 12/4666
10,097,372 B2 * 10/2018 Bhattacharya ........ H04L 45/745
(Continued)

FOREIGN PATENT DOCUMENTS

| CN | 102801715 A | 11/2012 |
|---|---|---|
| CN | 102884763 A | 1/2013 |

(Continued)

OTHER PUBLICATIONS

Machine Translation and Abstract of Chinese Publication No. CN103631652, Mar. 12, 2014, 21 pages.
(Continued)

*Primary Examiner* — Benjamin C Wu
(74) *Attorney, Agent, or Firm* — Conley Rose, P.C.

(57) ABSTRACT

A method for synchronizing virtual machine location information between data center gateways, a gateway, and a system, where a second gateway of a second data center receives a first location update message from a first gateway of a first data center, where the first location update message notifies that location information of the first virtual machine is changed. The second gateway deletes, according to the first location update message, a media access control (MAC) route of the first virtual machine saved in the second gateway, and the second gateway learns, from the first virtual machine to obtain current location information of the first virtual machine when the second gateway receives a packet destined for the first virtual machine and the second gateway does not save the MAC route of the first virtual machine.

14 Claims, 4 Drawing Sheets

(51) Int. Cl.
*H04L 12/66* (2006.01)
*H04L 29/06* (2006.01)
*G06F 9/455* (2018.01)
*H04L 12/24* (2006.01)

(52) U.S. Cl.
CPC .............. *H04L 12/66* (2013.01); *H04L 29/06* (2013.01); *H04L 41/12* (2013.01); *H04L 61/6022* (2013.01); *G06F 2009/4557* (2013.01); *G06F 2009/45595* (2013.01)

(56) References Cited

U.S. PATENT DOCUMENTS

| | | | | |
|---|---|---|---|---|
| 2007/0165537 | A1* | 7/2007 | Magnusson | H04W 48/18 370/254 |
| 2011/0019676 | A1* | 1/2011 | Portolani | H04L 45/00 370/395.53 |
| 2012/0023208 | A1 | 1/2012 | Hadas et al. | |
| 2012/0236761 | A1 | 9/2012 | Yang et al. | |
| 2012/0311568 | A1* | 12/2012 | Jansen | G06F 9/45558 718/1 |
| 2013/0232492 | A1* | 9/2013 | Wang | H04L 61/2084 718/1 |
| 2013/0250951 | A1 | 9/2013 | Koganti | |
| 2014/0064104 | A1* | 3/2014 | Nataraja | H04L 61/103 370/248 |
| 2014/0223013 | A1* | 8/2014 | Gaglianello | H04L 61/2084 709/226 |
| 2014/0250220 | A1 | 9/2014 | Kapadia et al. | |
| 2015/0012665 | A1 | 1/2015 | Kang et al. | |

FOREIGN PATENT DOCUMENTS

| | | |
|---|---|---|
| CN | 103379185 A | 10/2013 |
| CN | 103428252 A | 12/2013 |
| CN | 103631652 A | 3/2014 |
| CN | 103916320 A | 7/2014 |

OTHER PUBLICATIONS

Machine Translation and Abstract of Chinese Publication No. CN103916320, Jul. 9, 2014, 25 pages.
Foreign Communication From a Counterpart Application, Chinese Application No. 201410693597.2, Chinese Office Action dated Jun. 29, 2018, 7 pages.
Machine Translation and Abstract of Chinese Publication No. CN102801715, Nov. 28, 2012, 11 pages.
Machine Translation and Abstract of Chinese Publication No. CN102884763, Jan. 16, 2013, 17 pages.
Machine Translation and Abstract of Chinese Publication No. CN103428252, Dec. 4, 2013, 23 pages.
Foreign Communication From a Counterpart Application, PCT Application No. PCT/CN2015/081801, English Translation of International Search Report dated Aug. 19, 2015, 2 pages.
Foreign Communication From a Counterpart Application, PCT Application No. PCT/CN2015/081801, English Translation of Written Opinion dated Aug. 19, 2015, 5 pages.
Foreign Communication From a Counterpart Application, European Application No. 15863873.4, Extended European Search Report dated Oct. 18, 2017, 6 pages.

* cited by examiner

METHOD FOR SYNCHRONIZING VIRTUAL MACHINE LOCATION INFORMATION BETWEEN DATA CENTER GATEWAYS, GATEWAY, AND SYSTEM

CROSS-REFERENCE TO RELATED APPLICATIONS

This application is a continuation of International Patent Application No. PCT/CN2015/081801 filed on Jun. 18, 2015, which claims priority to Chinese Patent Application No. 201410693597.2 filed on Nov. 26, 2014. The disclosures of the aforementioned applications are hereby incorporated by reference in their entireties.

TECHNICAL FIELD

This disclosure relates to the communications field, and in particular, to a method for synchronizing virtual machine location information between data center gateways, a gateway, and a system.

BACKGROUND

At present, a virtual machine can be migrated between interconnected data centers. However, after the virtual machine is migrated across data centers, location information of the virtual machine is changed. Therefore, all the interconnected data centers need to update an outbound interface of the virtual machine in a local media access control (MAC) routing table in order to synchronize the location information of the virtual machine such that all the data centers can accurately forward a data flow that accesses the virtual machine.

A method for synchronizing location information of a migrated virtual machine is as follows.

Figure 1:
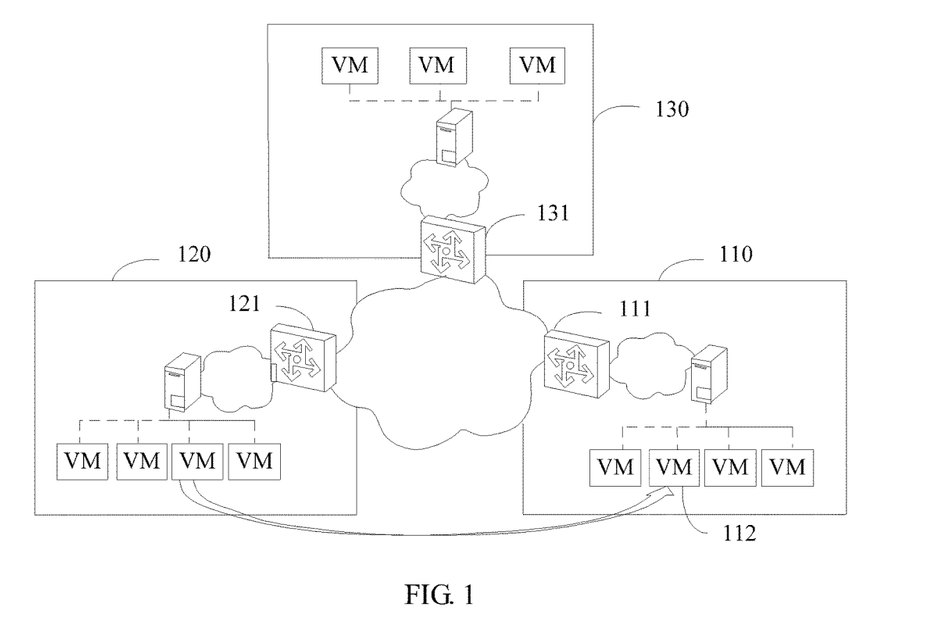
FIG. 1 is a schematic structural diagram of a network system including data centers.

As shown in FIG. 1, after a first virtual machine (designated as VM) 112 is migrated from a second data center 120 to a first data center 110, the first virtual machine 112 broadcasts a gratuitous Address Resolution Protocol (ARP) packet in the first data center 110.

After receiving the gratuitous ARP packet, a first gateway 111 of the first data center 110 finds that the first gateway 111 has saved a MAC routing entry of the first virtual machine 112, and a MAC address and an Internet Protocol (IP) address of the first virtual machine 112 belong to the first data center 110. Therefore, the first gateway 111 updates an outbound interface in the MAC routing entry of the first virtual machine 112 to a local outbound interface, increases a saved serial number corresponding to the first virtual machine 112 by one, and sends a new serial number, that is increased by one, of the first virtual machine 112 to a gateway of another data center using a Border Gateway Protocol (BGP) message. In FIG. 1, the BGP message reaches a second gateway 121 of the second data center 120 and a third gateway 131 of a third data center 130.

After receiving the new serial number of the first virtual machine 112, the second gateway 121 and the third gateway 131 compare the new serial number of the first virtual machine 112 with a saved original serial number of the first virtual machine 112. If the new serial number is greater than the locally saved original serial number, the locally saved serial number of the first virtual machine 112 is updated to the received new serial number, and an outbound interface of the first virtual machine 112 in a local MAC routing table is updated to an outbound interface corresponding to the first data center 110 on a network side in order to update location information of the first virtual machine 112.

However, the foregoing manner has the following problems.

If the second data center 120 in which the first virtual machine 112 is located before migration recovers normal communication after the second gateway 121 is faulty, after fault rectification, the second gateway 121 republishes a MAC route of the first virtual machine 112 in the second data center 120 to a gateway of another data center using a BGP message. A serial number in the BGP message is obtained by increasing a saved serial number by one. However, actually the first virtual machine 112 is already migrated to the first data center 110 and completes registration. Therefore, the first gateway 111 also publishes the MAC route of the first virtual machine 112 in the first data center 110 using a BGP message. As described above, the serial number in the BGP message published by the first gateway 111 is also obtained by increasing, by one, a serial number generated according to the MAC address and the IP address. Because the serial numbers in the two BGP messages that are published by the first gateway 111 and the second gateway 121 are the same, when the third gateway 131 of the other data center receives the two BGP messages, the third gateway 131 cannot determine the data center in which the first virtual machine 112 currently is actually located, and may inaccurately update a location of the first virtual machine 112 to the second data center 120.

Therefore, in other approaches, location information of a virtual machine may be inaccurately updated to a data center in which the virtual machine is located before migration. In this case, when the data center in which the virtual machine is located before migration deletes old virtual machine information, long time interruption of traffic accessing the virtual machine is caused.

SUMMARY

This disclosure provides a method for synchronizing virtual machine location information between data center gateways, a gateway, and a system in order to implement accurate synchronization of virtual machine location information between data centers and reduce a possibility of traffic interruption.

According to a first aspect of this disclosure, a method for synchronizing virtual machine location information between data center gateways is provided, including receiving, by a second gateway of a second data center, a first location update message sent by a first gateway of a first data center, where the first location update message is sent by the first gateway when detecting that a first virtual machine is migrated to the first data center in a cross-data center manner, and is used to notify that location information of the first virtual machine is changed, deleting, by the second gateway according to the first location update message, a MAC route of the first virtual machine saved in the second gateway, and learning, by the second gateway, from the first virtual machine to obtain current location information of the first virtual machine when the second gateway receives a packet destined for the first virtual machine and the second gateway does not save the MAC route of the first virtual machine.

With reference to the first aspect, in a first implementation manner of the first aspect, the first location update message includes the location information of the first virtual machine and a serial number indicating a quantity of times of migration of the first virtual machine, and deleting, by the second gateway according to the first location update message, a MAC route of the first virtual machine saved in the second gateway when the location information of the first virtual machine is different from location information of the first virtual machine in a MAC routing table of the second gateway, and the serial number in the first location update message is the same as a serial number of the first virtual machine saved in the second gateway includes determining that there is a conflict between the location information of the first virtual machine in the first location update message and location information of the first virtual machine in the MAC routing table of the second gateway, and deleting the MAC route of the first virtual machine saved in the second gateway.

With reference to the first implementation manner of the first aspect, in a second implementation manner of the first aspect, the method further includes updating a serial number of the second virtual machine saved in the second gateway if the second gateway detects that a second virtual machine is migrated from a third data center to the second data center, and sending, by the second gateway, a second location update message including the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when there is a conflict between the location information of the second virtual machine.

With reference to the second implementation manner of the first aspect, in a third implementation manner of the first aspect, after the second gateway detects that the second virtual machine is migrated from the third data center to the second data center, the method further includes updating, to an interface of the second gateway by the second gateway, an outbound interface of the second virtual machine in the MAC routing table saved in the second gateway, and updating a serial number of the second virtual machine saved in the second gateway includes updating, by the second gateway, a BGP entry of the second virtual machine saved in the second gateway, where the BGP entry of the second virtual machine includes the serial number of the second virtual machine.

With reference to the third implementation manner of the first aspect, in a fourth implementation manner of the first aspect, updating, to an interface of the second gateway by the second gateway, an outbound interface of the second virtual machine in the MAC routing table saved in the second gateway includes deleting, by the second gateway, an entry corresponding to the second virtual machine and in the network side MAC routing table, and adding, to the access side MAC routing table, an entry indicating that the outbound interface of the second virtual machine is the interface of the second gateway when the second gateway stores a network side MAC routing table and an access side MAC routing table, or changing the outbound interface of the second virtual machine in the MAC routing table from a network side outbound interface to the interface of the second gateway when the second gateway stores only one MAC routing table.

According to a second aspect of this disclosure, a gateway is provided, where the gateway is a second gateway of a second data center, and includes a memory and a processor, where the memory is configured to store instructions, the processor is configured to execute the instructions to receive a first location update message sent by a first gateway of a first data center, where the first location update message is sent by the first gateway when detecting that a first virtual machine is migrated to the first data center in a cross-data center manner, and is used to notify that location information of the first virtual machine is changed, the deletion module is configured to delete, according to the first location update message, a MAC route of the first virtual machine saved in the second gateway when the receiving module receives the first location update message, and the learning module is configured to learn from the first virtual machine to obtain current location information of the first virtual machine when a packet destined for the first virtual machine is received and the second gateway does not save the MAC route of the first virtual machine.

With reference to the second aspect, in a first implementation manner of the second aspect, the first location update message includes the location information of the first virtual machine and a serial number indicating a quantity of times of migration of the first virtual machine, and the processor is further configured to execute the instructions to determine that there is a conflict between the location information of the first virtual machine in the first location update message and location information of the first virtual machine in the MAC routing table of the second gateway, when the location information of the first virtual machine is different from location information of the first virtual machine in a MAC routing table of the second gateway, and the serial number in the first location update message is the same as a serial number of the first virtual machine saved in the second gateway, and delete the MAC route of the first virtual machine saved in the second gateway.

With reference to the first implementation manner of the second aspect, in a second implementation manner of the second aspect, where the processor is further configured to execute the instructions to update a serial number of the second virtual machine saved in the second gateway when it is detected that a second virtual machine is migrated from a third data center to the second data center, and send a second location update message including the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when there is a conflict between the location information of the second virtual machine.

With reference to the second implementation manner of the second aspect, in a third implementation manner of the second aspect, the processor is further configured to execute the instructions to update, to an interface of the second gateway, an outbound interface of the second virtual machine in the MAC routing table saved in the second gateway, and update a BGP entry of the second virtual machine saved in the second gateway, where the BGP entry of the second virtual machine includes the serial number of the second virtual machine.

With reference to the third implementation manner of the second aspect, in a fourth implementation manner of the second aspect, the processor is further configured to execute the instructions to delete an entry corresponding to the second virtual machine and in the network side MAC routing table, and add, to the access side MAC routing table, an entry indicating that the outbound interface of the second virtual machine is the interface of the second gateway when the second gateway stores a network side MAC routing table and an access side MAC routing table, or change the outbound interface of the second virtual machine in the MAC routing table from a network side outbound interface to the interface of the second gateway when the second gateway stores only one MAC routing table.

According to a third aspect of this disclosure, a network system including data centers is provided, including a first data center and a second data center, where the first data center includes a first gateway and at least one virtual machine, and the second data center includes a second gateway and at least one virtual machine, where the first gateway is configured to send, to a gateway of another data center in the network system, a first location update message to notify that location information of the first virtual machine is changed when detecting that a first virtual machine is migrated to the first data center in a cross-data center manner, and the second gateway is configured to receive the first location update message sent by the first gateway, delete, according to the first location update message, a MAC route of the first virtual machine saved in the second gateway, and learn from the first virtual machine to obtain current location information of the first virtual machine when a packet destined for the first virtual machine is received and the second gateway does not save the MAC route of the first virtual machine.

With reference to the third aspect, in a first implementation manner of the third aspect, the first gateway is configured to update a serial number of the first virtual machine saved in the first gateway, and send the first location update message to the gateway of the other data center than the first data center when detecting that the first virtual machine is migrated to the first data center in a cross-data center manner, where the first location update message includes the location information of the first virtual machine and a serial number indicating a quantity of times of migration of the first virtual machine, and when the location information of the first virtual machine is different from location information of the first virtual machine in a MAC routing table of the second gateway, and the serial number in the first location update message is the same as a serial number of the first virtual machine saved in the second gateway, the second gateway is configured to determine that there is a conflict between the location information of the first virtual machine in the first location update message and location information of the first virtual machine in the MAC routing table of the second gateway, and delete the MAC route of the first virtual machine saved in the second gateway.

With reference to the first implementation manner of the third aspect, in a second implementation manner of the third aspect, the first gateway is configured to update an outbound interface of the first virtual machine in a MAC routing table saved in the first gateway to an interface of the first gateway, and update a BGP entry of the first virtual machine saved in the first gateway, where the BGP entry of the first virtual machine includes the serial number of the first virtual machine.

With reference to the second implementation manner of the third aspect, in a third implementation manner of the third aspect, the first gateway is configured to delete an entry corresponding to the first virtual machine and in the network side MAC routing table, and add, to the access side MAC routing table, an entry indicating that the outbound interface of the first virtual machine is the interface of the first gateway when the first gateway stores a network side MAC routing table and an access side MAC routing table, or change the outbound interface of the first virtual machine in the MAC routing table from a network side outbound interface to the interface of the first gateway when the first gateway stores only one MAC routing table.

In the foregoing solution, when location information of a virtual machine in a data center is changed, a gateway of the data center sends a location update message such that when receiving the location update message, gateways of all other data centers delete a locally saved MAC route of the virtual machine. This avoids a case in which a location information update error occurs in a location change process of the virtual machine. Then, when there is traffic destined for the virtual machine, the gateway of the other data center learns from the virtual machine to obtain accurate location information of the virtual machine, thereby implementing accurate synchronization of virtual machine location information between data centers, and reducing a possibility of traffic interruption due to inaccurate virtual machine location information.

DESCRIPTION OF EMBODIMENTS

In the following description, to illustrate rather than limit, specific details such as a particular system structure, an interface, and a technology are provided to make a thorough understanding of this disclosure. However, a person skilled in the art should know that this disclosure may be practiced in other implementation manners without these specific details. In other cases, detailed descriptions of well-known apparatuses, circuits, and methods are omitted such that this disclosure is described without being obscured by unnecessary details.

Figure 2:
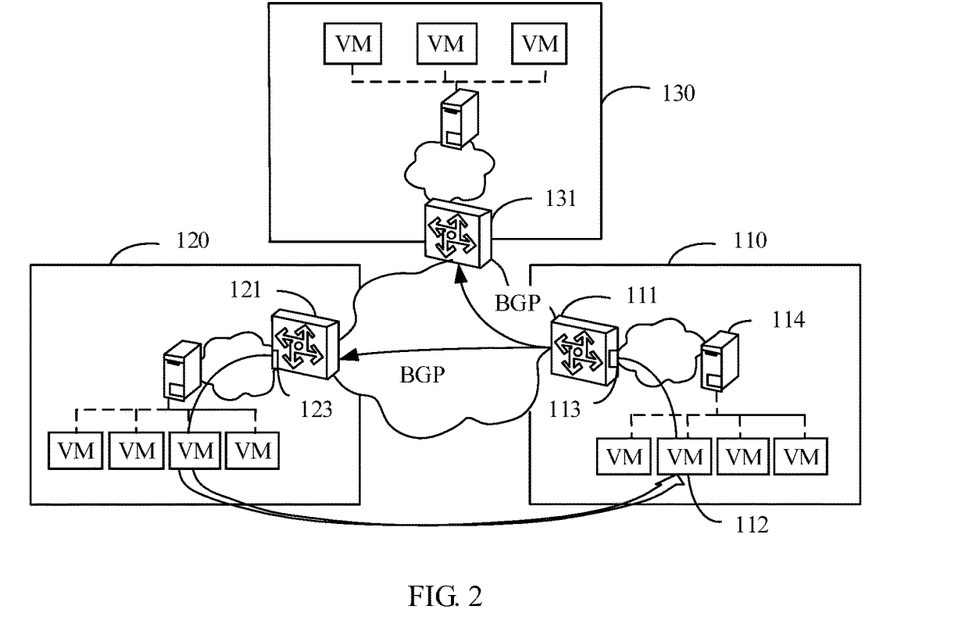
FIG. 2 is a schematic structural diagram of an implementation manner of a network system including data centers according to this disclosure.

Referring to FIG. 2, FIG. 2 is a schematic structural diagram of an implementation manner of a network system including data centers in this disclosure. The network system includes multiple data centers, and the data centers may communicate with each other. In this implementation manner, for example, the network system includes three data centers, a first data center 110, a second data center 120, and a third data center 130. Each data center includes a gateway and at least one virtual machine. Multiple virtual machines of each data center may be disposed in one or more hosts, for example, all virtual machines in the first data center 110 are disposed in a host 114. The virtual machine of each data center communicates with a virtual machine in another data center using the gateway. The gateway of each data center saves a MAC routing entry of a registered virtual machine in the data center, where a MAC routing entry of each virtual machine includes a MAC address and an outbound interface of the virtual machine. Because each virtual machine communicates with another data center using a gateway, the outbound interface of the virtual machine is an interface of the gateway of a data center in which the virtual machine is located. When a user of a data center needs to access a virtual machine of another data center, a gateway of the data center in which the user is located sends, according to the MAC routing entry, data sent by the user to a gateway corresponding to an outbound interface of a destination virtual machine, and the gateway forwards the data to the destination virtual machine in order to implement cross-data center communication between the virtual machines.

When a first virtual machine 112 is migrated from the second data center 120 to the first data center 110, the first virtual machine 112 sends a registration message to a first gateway 111 of the first data center 110, and the first gateway 111 receives the registration message sent by the first virtual machine 112. It is learned by means of BGP calculation that an outbound interface of the first virtual machine 112 is changed from a network side interface to a local interface. The outbound interface of the first virtual machine 112 in a MAC routing table stored locally in the first gateway 111 is updated to the local interface, that is, an interface of the first gateway 111.

When the first gateway 111 stores a network side MAC routing table and an access side MAC routing table, updating, to the local interface, the outbound interface of the first virtual machine 112 in the MAC routing table stored locally in the first gateway 111 includes deleting an entry corresponding to the first virtual machine 112 and in the network side MAC routing table, and adding, to the access side MAC routing table, an entry indicating that the outbound interface of the first virtual machine 112 is the interface of the first gateway 111.

When the first gateway 111 stores only one MAC routing table, updating, to the local interface, the outbound interface of the first virtual machine 112 in the MAC routing table stored locally in the first gateway 111 includes changing the outbound interface of the first virtual machine 112 in the MAC routing table from a network side outbound interface to the local interface of the first gateway 111.

In an example of FIG. 2, the first virtual machine 112 before migration is located in the second data center 120, and communicates with a second gateway 121 using a second interface 123. The migrated first virtual machine 112 communicates with the first gateway 111 using a first interface 113. Therefore, the first gateway 111 changes an outbound interface of the first virtual machine 112 in a unique MAC routing table from the network side interface to the local interface, that is, the first interface 113.

After updating a local MAC routing table, the first gateway 111 adds, to a locally saved BGP table, an entry corresponding to the first virtual machine 112. The entry includes a MAC address of the first virtual machine 112, an IP address of the first gateway 111, and a serial number. An initial value of the serial number is generated, according to the MAC address and the IP address of the first virtual machine 112, by a gateway, for example, the second gateway 121, that the first virtual machine 112 first accesses. Then, the initial value is published by the earliest accessed gateway to another gateway. Afterward, each time the first virtual machine 112 is migrated, an accessed gateway after the migration increases the serial number by 1. In this embodiment, the first gateway 111 increases, by 1, the serial number of the first virtual machine 112 saved in the BGP table to obtain a new serial number, generates a location update message including the MAC address and the new serial number of the first virtual machine 112, that is, a BGP message, and separately sends the BGP message to the second gateway 121 and a third gateway 131. The BGP message notifies the second gateway 121 and the third gateway 131 that location information of the first virtual machine 112 is changed.

The second gateway 121 of the second data center 120 receives the location update message, and determines, according to a fact that the location update message of the first virtual machine 112 is originated from the first gateway, that the first virtual machine 112 is migrated to the first data center 110. In this case, if the serial number of the first virtual machine 112 carried in the location update message is the same as a serial number saved in the second gateway 121, it is determined that there is a conflict between the location information of the first virtual machine 112 in the first location update message and location information of the first virtual machine 112 in the MAC routing table of the second gateway 121, and the second gateway 121 directly deletes a MAC routing entry of the first virtual machine 112 saved in the second gateway 121, and sends a withdraw message to a gateway of another data center, where the withdraw message notifies the gateway of the other data center that the second data center 120 has withdrawn the first virtual machine 112. That is, the first virtual machine 112 is not located in the second data center 120 anymore. If the second gateway 121 determines that the serial number of the first virtual machine 112 carried in the location update message is greater than the serial number saved in the second gateway 121, it is determined that there is no conflict between the location information of the first virtual machine in the first location update message and location information of the first virtual machine in the MAC routing table of the second gateway 121, the outbound interface of the entry corresponding to the first virtual machine 112 in the MAC routing table saved in the second gateway 121 is updated to the interface of the first gateway 111 to directly update the location information of the first virtual machine 112, and a withdraw message is sent to a gateway of another data center.

The third gateway 131 of the third data center 130 receives the location update message. Similar to the second gateway 121, the third gateway 131 finds, according to the source of the location update message, that the outbound interface of the first virtual machine 112 is changed. In this case, the third gateway 131 determines, according to the serial number of the first virtual machine 112 in the location update message, whether there is a conflict between the location information of the first virtual machine 112. If there is a conflict between the location information of the first virtual machine 112, a MAC routing table saved in the third gateway 131 is not updated, and an entry corresponding to the first virtual machine 112 in the MAC routing table saved in the third gateway 131 is directly deleted. If there is no conflict between the location information of the first virtual machine 112, location information of the first virtual machine 112 in the MAC routing table saved in the third gateway 131 is directly updated.

In the network system, each data center gateway in which the location information of the first virtual machine 112 is in conflict deletes the MAC route of the first virtual machine 112 saved in the gateway. Therefore, when a user in the data center in which the location information of the first virtual machine 112 is in conflict needs to access the first virtual machine 112, the gateway of the data center broadcasts an ARP request packet. The gateway of each data center forwards the ARP request packet to all virtual machines registered with the data center. When receiving the ARP request packet, the first virtual machine 112 sends an ARP reply packet. After receiving the ARP reply packet, the gateway of the data center in which the user is located learns that the first virtual machine 112 is currently located in the first data center 110. Therefore, the MAC routing entry of the first virtual machine 112 is added to the MAC routing table saved in the gateway of the data center in which the user is located. In the MAC routing entry, the outbound interface of the first virtual machine 112 is the interface of the first gateway 111, and the gateway of the data center in which the user is located sends the MAC route of the first virtual machine 112 to a gateway of another data center using a BGP message such that after receiving the BGP message, all other gateways learn that the first virtual machine 112 is in the first data center 110, and locally add the MAC route of the first virtual machine 112, thereby implementing synchronization of the location information of the first virtual machine in the entire network system.

Likewise, when any virtual machine in the network system is migrated across data centers, a gateway of a data center in which the migrated virtual machine is located performs steps similar to steps that the first gateway 111 performs. A gateway of a data center in which the virtual machine is located before migration performs steps similar to steps that the second gateway 121 performs. A gateway of a data center other than the data center in which the virtual machine is located before migration and the data center in which the virtual machine is located after migration performs steps similar to steps that the third gateway 131 performs.

In this disclosure, a MAC route of a virtual machine is deleted in an entire network when there is a conflict after the virtual machine is migrated. Therefore, even if all gateways of data centers in which the virtual machine is located before and after migration send location update information of the virtual machine whose serial number is the same, all gateways, in this network system, that receive the location update information consider that there is a conflict of locations of the virtual machine and directly delete a locally saved MAC route of the virtual machine, and do not learn the MAC route of the virtual machine until the gateways receive traffic destined for the virtual machine, thereby avoiding a case in which a location information update error of the virtual machine occurs because a true location of the virtual machine cannot be determined due to existence of multiple different location update messages of the virtual machine.

Certainly, in another implementation manner, particularly, in an implementation manner in which a location update message sent by a gateway does not include a serial number, after receiving a location update message of a first virtual machine, a gateway of a data center can directly delete a MAC route of the first virtual machine saved in the gateway of the data center without conflict determining. Compared with the foregoing implementation manner in which conflict determining is performed before deletion, in this implementation manner, each time the gateway of the data center receives a location update message of a virtual machine, the gateway deletes a MAC route of the virtual machine. Therefore, after the virtual machine is migrated, all gateways that receive the location update message of the virtual machine need to relearn the MAC route of the virtual machine at least when the migrated virtual machine is accessed for the first time in order to avoid a location update error of the migrated virtual machine to a further extent. Further, a gateway of a data center in which the migrated virtual machine is located may delete a locally saved MAC route of the virtual machine after sending the location update message of the virtual machine such that all gateways in a network system need to relearn the MAC route of the virtual machine in order to avoid a location update error of the migrated virtual machine completely.

Figure 3:
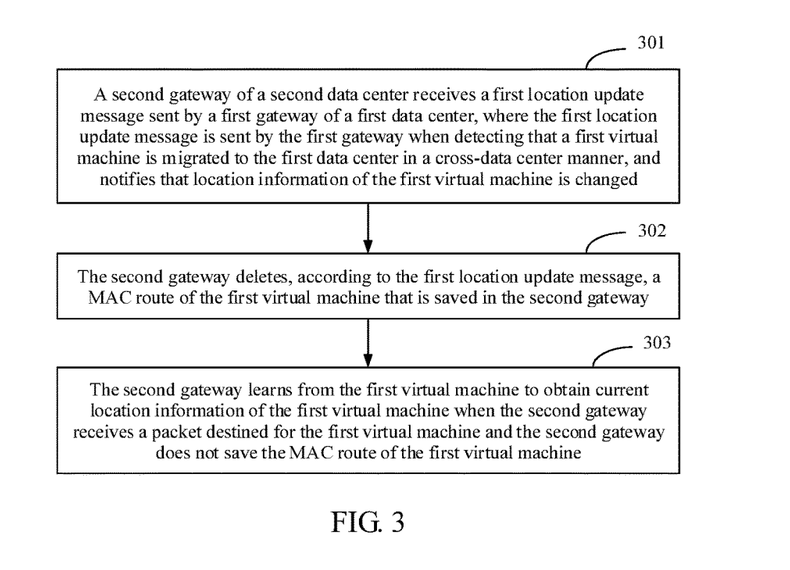
FIG. 3 is a flowchart of an implementation manner of a method for synchronizing virtual machine location information between data center gateways according to this disclosure.

Referring to FIG. 3, FIG. 3 is a flowchart of an implementation manner of a method for synchronizing virtual machine location information between data center gateways according to this disclosure. In this implementation manner, a virtual machine migration between data centers is used as an example. Further, this method includes the following steps.

Step 301: A second gateway of a second data center receives a first location update message sent by a first gateway of a first data center, where the first location update message is sent by the first gateway when detecting that a first virtual machine is migrated to the first data center in a cross-data center manner, and notifies that location information of the first virtual machine is changed.

In an example of this implementation manner, the first virtual machine is migrated across data centers. When the first virtual machine is migrated from another data center to the first data center, the first gateway of the first data center sends, to a gateway of another data center, the first location update message, such as a BGP message, notifies that the location information of the first virtual machine is changed. The second gateway of the second data center that can communicate with the first data center receives the first location update message.

Step 302: The second gateway deletes, according to the first location update message, a MAC route of the first virtual machine saved in the second gateway.

After receiving the first location update message sent by the first gateway, the second gateway determines, according to a fact that the location update message of the first virtual machine is originated from the first gateway, that a location of the first virtual machine is changed, and therefore deletes the MAC route of the first virtual machine saved in the second gateway.

Further, if the second gateway finds that the location of the first virtual machine is changed from a local side to a network side, that is, the first virtual machine is located in the second data center before migration, the second gateway may further send a withdraw message to a gateway of another data center to notify that the second data center has withdrawn the first virtual machine.

Preferably, the first location update message sent by the first gateway may include the location information of the first virtual machine and a serial number indicating a quantity of times of migration of the first virtual machine. That the second gateway deletes the MAC route of the first virtual machine saved in the second gateway includes determining whether the location information of the first virtual machine is the same as location information of the first virtual machine in a MAC routing table of the second gateway, and determining whether the serial number in the first location update message is the same as a serial number of the first virtual machine saved in the second gateway after the first location update message is received, and when the location information of the first virtual machine is different from the location information of the first virtual machine in the MAC routing table of the second gateway, and the serial number in the first location update message is the same as the serial number of the first virtual machine saved in the second gateway, determining that there is a conflict between the location information of the first virtual machine in the first location update message and location information of the first virtual machine in the MAC routing table of the second gateway and deleting the MAC route of the first virtual machine saved in the second gateway, or when the location information of the first virtual machine is different from the location information of the first virtual machine in the MAC routing table of the second gateway, and the serial number in the first location update message is different from the serial number of the first virtual machine saved in the second gateway, determining that there is no conflict between the location information of the first virtual machine in the first location update message and location information of the first virtual machine in the MAC routing table of the second gateway. The second gateway updates the location information of the first virtual machine in the MAC routing table of the second gateway to the location information of the first virtual machine in the location update message. The location information of the first virtual machine may be address information of a data center gateway connected to the first virtual machine.

Step 303: The second gateway learns from the first virtual machine to obtain current location information of the first virtual machine when the second gateway receives a packet destined for the first virtual machine and the second gateway does not save the MAC route of the first virtual machine.

When a user of the second data center needs to access the first virtual machine, if the second gateway receives the packet destined for the first virtual machine, and finds that the MAC routing table saved in the second gateway does not include the MAC route of the first virtual machine, the second gateway broadcasts an ARP request packet. A gateway of each data center forwards the ARP request packet to all virtual machines registered with the data center. When receiving the ARP request packet, the first virtual machine sends an ARP reply packet. After receiving the ARP reply packet, the second gateway learns that the first virtual machine is currently located in the first data center, and therefore, adds a MAC routing entry of the first virtual machine to the MAC routing table saved in the second gateway. In the MAC routing entry, an outbound interface of the first virtual machine is an interface of the first gateway, thereby implementing accurate synchronization of the changed location information of the first virtual machine.

Further, after learning the current location of the first virtual machine, the second gateway may further send the MAC route of the first virtual machine to a gateway of another data center using a BGP message such that after receiving the BGP message, all other gateways learn that the first virtual machine is in the first data center, and locally add the MAC route of the first virtual machine, thereby implementing synchronization of the location information of the first virtual machine in an entire network system.

In this implementation manner, when location information of a virtual machine in a data center is changed, a gateway of the data center sends a location update message such that when receiving the location update message, gateways of all other data centers delete a locally saved MAC route of the virtual machine. This avoids a case in which a location information update error occurs in a location change process of the virtual machine. Then, when there is traffic destined for the virtual machine, the gateway of the other data center learns from the virtual machine to obtain accurate location information of the virtual machine, thereby implementing accurate synchronization of virtual machine location information between data centers, and reducing a possibility of traffic interruption due to inaccurate virtual machine location information.

Figure 4:
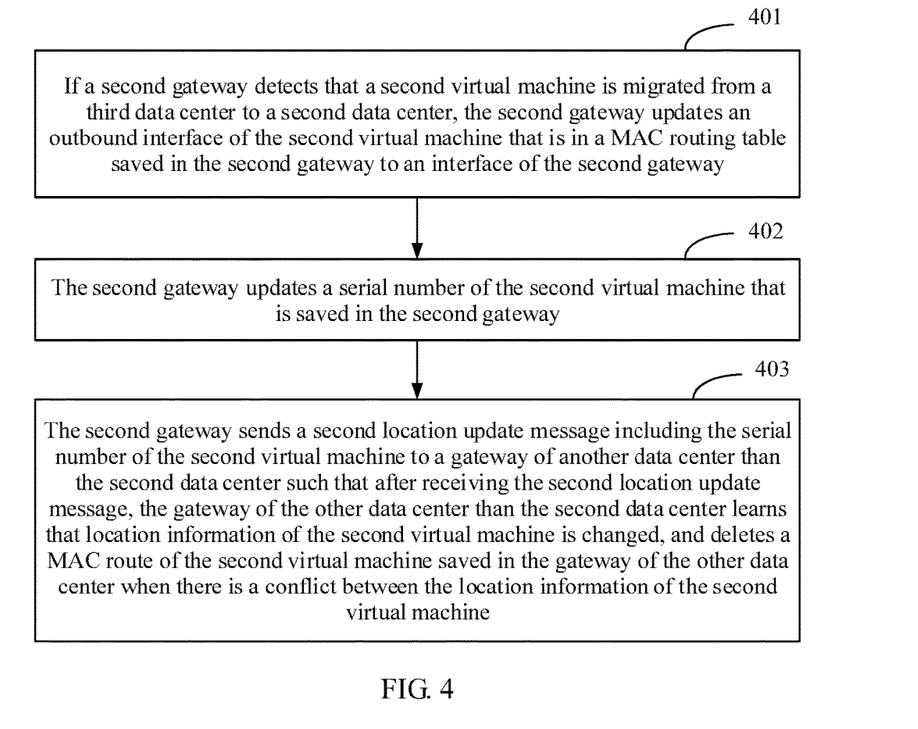
FIG. 4 is a partial flowchart of another implementation manner of a method for synchronizing virtual machine location information between data center gateways according to this disclosure.

Referring to FIG. 4, FIG. 4 is a partial flowchart of another implementation manner of a method for synchronizing virtual machine location information between data center gateways in this disclosure. In this implementation manner, a virtual machine migration between data centers is still used as an example. Based on FIG. 3, the implementation manner further includes the following steps.

Step 401: If the second gateway detects that a second virtual machine is migrated from a third data center to the second data center, the second gateway updates, to an interface of the second gateway, an outbound interface of the second virtual machine in a MAC routing table saved in the second gateway.

Further, similar to the first gateway in the foregoing implementation manner, when the second virtual machine is migrated from the third data center to the second data center, the second virtual machine sends a registration message to the second gateway of the second data center. When receiving the registration message of the second virtual machine, the second gateway detects that the outbound interface of the second virtual machine is changed from a network side interface to a local interface, and then updates, to the interface of the second gateway, the outbound interface of the second virtual machine in the MAC routing table stored in the second gateway.

When the second gateway stores a network side MAC routing table and an access side MAC routing table, updating, to the interface of the second gateway, the outbound interface of the second virtual machine in the MAC routing table stored in the second gateway includes deleting an entry corresponding to the second virtual machine and in the network side MAC routing table saved in the second gateway, and adding, to the access side MAC routing table saved in the second gateway, an entry indicating that the outbound interface of the second virtual machine is the interface of the second gateway.

When the second gateway stores only one MAC routing table, updating, to the interface of the second gateway, the outbound interface of the second virtual machine in the MAC routing table stored in the second gateway includes changing the outbound interface of the second virtual machine in the MAC routing table saved in the second gateway from the network side outbound interface to the interface of the second gateway.

Step 402: The second gateway updates a serial number of the second virtual machine saved in the second gateway.

For example, after updating the local MAC routing table, the second gateway updates an entry, corresponding to the second virtual machine, in a BGP table locally saved in the second gateway, where the entry includes a MAC address of the second virtual machine, an IP address of the second gateway, and a serial number. The serial number before updating included in the entry is published by a data center gateway accessed by the second virtual machine before migration. Afterward, the second gateway increases, by 1, the serial number before updating of the second virtual machine saved in the BGP table to obtain a new serial number.

Step 403: The second gateway sends a second location update message including the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when there is a conflict between the location information of the second virtual machine.

The second gateway generates the second location update message including the MAC address of the second virtual machine and the new serial number, that is, a BGP message, and separately sends the BGP message to the gateway of the other data centers. After the gateway of the other data center receives the second location update message, when the location information of the second virtual machine obtained from the second location update message is different from location information of the second virtual machine in a MAC route saved in the gateway, and the serial number in the second location update message is the same as a serial number of the second virtual machine saved in the gateway, the gateway of the other data center determines that there is a conflict between the location information of the second virtual machine and deletes a MAC routing entry of the second virtual machine saved in the gateway, or when the location information of the second virtual machine obtained according to the second location update message is different from the location information of the second virtual machine in the MAC route saved in the gateway, but the serial number in the second location update message is different from the serial number of the second virtual machine saved in the gateway, the gateway of the other data center determines that there is no conflict between the location information of the second virtual machine, and the gateway updates, to the interface of the second gateway, an outbound interface of a MAC entry corresponding to the second virtual machine and in the local MAC routing table in order to directly update the location information of the second virtual machine.

Optionally, after sending the second location update message, the second gateway may delete the MAC routing entry of the second virtual machine saved in the second gateway. Certainly, in another implementation manner, the second gateway may not delete the MAC routing entry of the second virtual machine saved in the second gateway, and only the gateway of the other data center deletes, after receiving the second location update message, the MAC routing entry of the second virtual machine saved in the gateway of the other data center.

Figure 5:
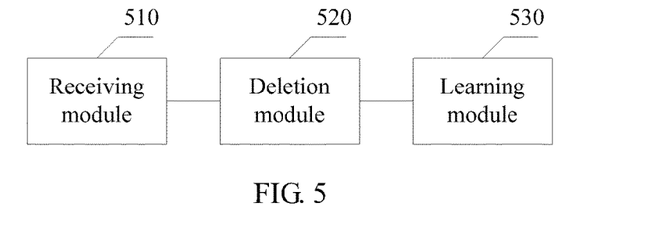
FIG. 5 is a schematic structural diagram of an implementation manner of a gateway according to this disclosure.

Referring to FIG. 5, FIG. 5 is a schematic structural diagram of an implementation manner of a gateway according to this disclosure. In this disclosure, for ease of description, the gateway is named a second gateway of a second data center. The gateway in this disclosure is usually a Virtual Extensible local area network (VXLAN) gateway in an overlay technology, and further, may be set as a provider edge (PE). Further, the gateway includes a receiving module 510, a deletion module 520, and a learning module 530.

The receiving module 510 is configured to receive a first location update message sent by a first gateway of a first data center, where the first location update message is sent by the first gateway when detecting that a first virtual machine is migrated to the first data center in a cross-data center manner, and notifies that location information of the first virtual machine is changed.

The deletion module 520 is configured to delete, according to the first location update message, a MAC route of the first virtual machine saved in the second gateway when the receiving module 510 receives the first location update message.

The first location update message includes the location information of the first virtual machine and a serial number indicating a quantity of times of migration of the first virtual machine. The deletion module 520 may be configured to determine whether the location information of the first virtual machine is the same as location information of the first virtual machine in a MAC route saved in the second gateway and whether the serial number in the first location update message is the same as a serial number of the first virtual machine saved in the second gateway, and when the location information of the first virtual machine is different from the location information of the first virtual machine in a MAC routing table of the second gateway, and the serial number in the first location update message is the same as the serial number of the first virtual machine saved in the second gateway, determine that there is a conflict between the location information of the first virtual machine in the first location update message and location information of the first virtual machine in the MAC routing table of the second gateway and delete the MAC route of the first virtual machine saved in the second gateway, or when the location information of the first virtual machine is different from the location information of the first virtual machine in the MAC routing table of the second gateway, and the serial number in the first location update message is different from the serial number of the first virtual machine saved in the second gateway, determine that there is no conflict between the location information of the first virtual machine in the first location update message and location information of the first virtual machine in the MAC routing table of the second gateway, and update the location information of the first virtual machine in the MAC route saved in the second gateway to the location information of the first virtual machine in the location update message.

The learning module 530 is configured to learn from the first virtual machine to obtain current location information of the first virtual machine when a packet destined for the first virtual machine is received and the second gateway does not save the MAC route of the first virtual machine.

Figure 6:
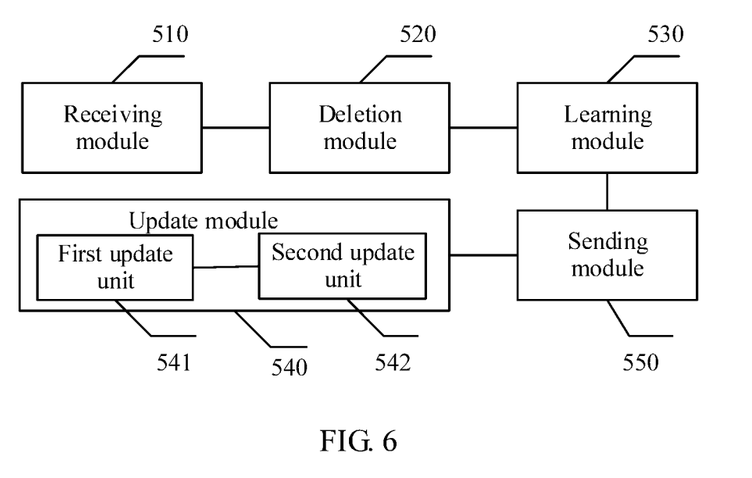
FIG. 6 is a schematic structural diagram of another implementation manner of a gateway according to this disclosure.

Referring to FIG. 6, FIG. 6 is a schematic structural diagram of another implementation manner of a gateway according to this disclosure. Based on the embodiment shown in FIG. 5, the gateway in this implementation manner further includes an update module 540 and a sending module 550. The update module 540 includes a first update unit 541 and a second update unit 542.

The update module 540 is configured to update a serial number of the second virtual machine saved in the second gateway when it is detected that a second virtual machine is migrated from a third data center to the second data center.

The first update unit 541 of the update module 540 is configured to update, to an interface of the second gateway, an outbound interface of the second virtual machine in a MAC routing table saved in the second gateway.

The first update unit 541 may be further configured to delete an entry corresponding to the second virtual machine and in the network side MAC routing table, and add, to the access side MAC routing table, an entry indicating that the outbound interface of the second virtual machine is the interface of the second gateway when the second gateway stores a network side MAC routing table and an access side MAC routing table, or change the outbound interface of the second virtual machine in the MAC routing table from a network side outbound interface to the interface of the second gateway when the second gateway stores only one MAC routing table.

The second update unit 542 of the update module 540 is configured to update a BGP entry of the second virtual machine saved in the second gateway. The BGP entry of the second virtual machine includes the serial number of the second virtual machine.

The sending module 550 is configured to send, after the update module 540 updates the serial number of the second virtual machine, a second location update message including the serial number of the second virtual machine to a gateway of another data center than the second data center such that after receiving the second location update message, the gateway of the other data center than the second data center learns that the location information of the second virtual machine is changed, and deletes a MAC route of the second virtual machine saved in the gateway of the other data center when there is a conflict between the location information of the second virtual machine.

In another implementation manner, the deletion module may be further configured to delete a MAC route of the second virtual machine saved in the second gateway after the sending module 550 sends the second location update message.

Figure 7:
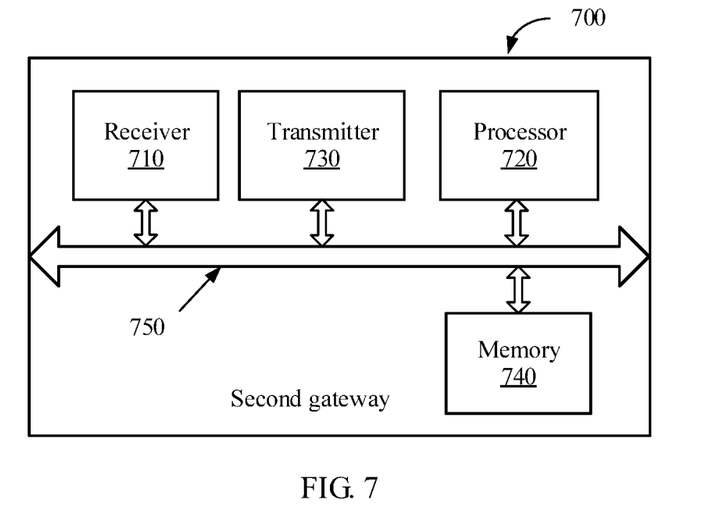
FIG. 7 is a schematic structural diagram of still another implementation manner of a gateway according to this disclosure.

Referring to FIG. 7, FIG. 7 is a schematic structural diagram of still another implementation manner of a gateway according to this disclosure. A gateway in this implementation manner may be a second gateway of a second data center. The second gateway 700 includes a receiver 710, a processor 720, a transmitter 730, a memory 740, and a bus 750.

The receiver 710 is configured to receive a first location update message sent by a first gateway of a first data center, where the first location update message is sent by the first gateway when detecting that a first virtual machine is migrated to the first data center in a cross-data center manner, and notifies that location information of the first virtual machine is changed.

The processor 720 is configured to delete, according to first location update message, a MAC route of the first virtual machine saved in the memory 740 of the second gateway 700 when the receiver 710 receives the first location update message, and when a packet destined for the first virtual machine is received and the memory 740 of the second gateway 700 does not save the MAC route of the first virtual machine, learn from the first virtual machine using the transmitter 730 in order to obtain current location information of the first virtual machine by means of receiving of the receiver 710. The transmitter 730 is configured to send an ARP request packet to a gateway of another data center to request a reply from the first virtual machine when the packet destined for the first virtual machine is received and the memory 740 of the second gateway 700 does not save the MAC route of the first virtual machine. The receiver 710 is further configured to obtain an ARP reply packet of the first virtual machine to obtain the current location information of the first virtual machine.

Optionally, the first location update message includes the location information of the first virtual machine and a serial number indicating a quantity of times of migration of the first virtual machine. That the processor 720 performs the step of deleting, according to the first location update message, the MAC route of the first virtual machine saved in the memory 740 of the second gateway 700 includes determining whether the location information of the first virtual machine is the same as location information of the first virtual machine in the MAC route saved in memory 740 of the second gateway 700 and whether the serial number in the first location update message is the same as a serial number of the first virtual machine saved in the memory 740 of the second gateway 700, and when the location information of the first virtual machine is different from the location information of the first virtual machine in the MAC routing table saved in the memory 740 of the second gateway 700, and the serial number in the first location update message is the same as the serial number of the first virtual machine saved in the memory 740 of the second gateway 700, determining that there is a conflict between the location information of the first virtual machine in the first location update message and location information of the first virtual machine in the MAC routing table of the second gateway 700 and deleting the MAC route of the first virtual machine saved in the memory 740 of the second gateway 700, or when the location information of the first virtual machine is different from the location information of the first virtual machine in the MAC routing table of the memory 740 of the second gateway 700, and the serial number in the first location update message is different from the serial number of the first virtual machine saved in the memory 740 of the second gateway 700, determining that there is no conflict between the location information of the first virtual machine in the first location update message and location information of the first virtual machine in the MAC routing table of the second gateway 700, and updating the location information of the first virtual machine in the MAC route saved in the memory 740 of the second gateway 700 to the location information of the first virtual machine in the location update message.

Optionally, when it is detected that a second virtual machine is migrated from a third data center to the second data center, the processor 720 is further configured to update a serial number of the second virtual machine saved in the memory 740 of the second gateway 700, and send, using the transmitter 730, a second location update message including the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when there is a conflict between the location information of the second virtual machine.

Optionally, that the processor 720 performs the step of updating the serial number of the second virtual machine saved in the second gateway 700 includes updating, to an interface of the second gateway 700, an outbound interface of the second virtual machine in the MAC routing table saved in the memory 740 of the second gateway 700, and updating a BGP entry of the second virtual machine saved in the memory 740 of the second gateway 700. The BGP entry of the second virtual machine includes the serial number of the second virtual machine.

Optionally, that the processor 720 performs the step of updating, to an interface of the second gateway 700, an outbound interface of the second virtual machine in the MAC routing table saved in the memory 740 of the second gateway 700 includes deleting an entry corresponding to the second virtual machine and in the network side MAC routing table, and adding, to the access side MAC routing table, an entry indicating that the outbound interface of the second virtual machine is the interface of the second gateway 700 when the memory 740 of the second gateway 700 stores a network side MAC routing table and an access side MAC routing table, or changing the outbound interface of the second virtual machine in the MAC routing table from a network side outbound interface to the interface of the second gateway 700 when the memory 740 of the second gateway 700 stores only one MAC routing table.

The memory 740 may include a read-only memory (ROM) and a random access memory (RAM), and provides an instruction and data for the processor 720. A part of the memory 740 may further include non-volatile random access memory (NVRAM).

The memory 740 stores the following elements: an executable module or a data structure, a subset of an executable module or a data structure, or an extended set of an executable module or a data structure operation instructions, including various operation instructions, used to implement various operations, and an operating system, including various system programs, used to implement various basic services and process hardware-based tasks.

In this embodiment of the present disclosure, the processor 720 executes the foregoing operations by invoking an operating instruction stored in the memory 740 (the operating instruction may be stored in the operating system).

In specific disclosure, all components of the second gateway 700 are coupled together using the bus 750. The bus 750 may include a power bus, a control bus, a status signal bus, and the like in addition to a data bus. However, for clarity of description, various buses are marked as the bus 750 in the FIG. 7.

The processor 720 may be an integrated circuit chip and has a signal processing capability. In an implementation process, the steps in the foregoing methods may be completed by means of an integrated logic circuit of hardware in the processor 720 or an instruction in a form of software. The processor 720 may be a central processing unit (CPU), a general purpose processor, a digital signal processor (DSP), an disclosure-specific integrated circuit (disclosureASIC), a field-programmable gate array (FPGA) or another programmable logic device, a discrete gate or a transistor logic device, or a discrete hardware assembly. These may implement or perform the methods, the steps, and logical block diagrams disclosed in the embodiments of the present disclosure. The general purpose processor may be a microprocessor, or may be any normal processor or the like. The steps of the methods disclosed with reference to the embodiments of the present disclosure may be directly performed and completed by a hardware decoding processor, or performed and completed by a combination of hardware and software modules in a decoding processor. The software module may be located in a mature storage medium in the field, such as a RAM, a flash memory, a ROM, a programmable read-only memory (PROM), an electrically-erasable programmable read-only memory (EEPROM), or a register. The storage medium is located in the memory 740. The processor 720 reads information from the memory 740, and completes the steps of the foregoing methods in combination with the hardware.

It may be understood that, all the gateways shown in FIG. 5 to FIG. 7 in the foregoing implementation manner are defined as the second gateway of the second data center. This is merely for clearer description. The gateway claimed by this disclosure should be a gateway of any data center in a network system.

This disclosure further provides an implementation manner of a network system including data centers. The network system includes multiple data centers, and each data center includes at least one gateway and a virtual machine. The virtual machine of the data center communicates with another data center using the gateway of the data center in which the virtual machine is located, where the gateway is the gateway in the foregoing implementation manner.

In the foregoing solution, when location information of a virtual machine in a data center is changed, a gateway of the data center sends a location update message such that when receiving the location update message, gateways of all other data centers delete a MAC route of the virtual machine locally saved in the gateways. This avoids a case in which a location information update error occurs in a location change process of the virtual machine. Then, when there is traffic destined for the virtual machine, the gateway of the other data center learns from the virtual machine to obtain accurate location information of the virtual machine, thereby implementing accurate synchronization of virtual machine location information between data centers, and reducing a possibility of traffic interruption due to inaccurate virtual machine location information. In addition, the solution of this disclosure may support an original communications protocol of the data center, and there is no need to change an original protocol field and a hardware structure.

In the several embodiments provided in this disclosure, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this disclosure. The foregoing storage medium includes any medium that can store program code, such as a universal serial bus (USB) flash drive, a removable hard disk, a ROM, a RAM, a magnetic disk, or an optical disc.

What is claimed is:

1. A method for synchronizing virtual machine location information between data center gateways, comprising:
   receiving, by a second gateway of a second data center, a first location update message from a first gateway of a first data center, wherein the first location update message is sent by the first gateway when detecting that a first virtual machine is migrated to the first data center in a cross-data center manner, wherein the first location update message notifies that location information of the first virtual machine is changed, and wherein the first location update message comprises the location information of the first virtual machine and a serial number indicating a quantity of times of migration of the first virtual machine;
   deleting, by the second gateway according to the first location update message, a media access control (MAC) route of the first virtual machine saved in the second gateway, wherein the MAC route is deleted by:
      determining that a conflict exists between the location information of the first virtual machine in the first location update message and location information of the first virtual machine in a MAC routing table of the second gateway; and
      deleting the MAC route of the first virtual machine saved in the second gateway when the location information of the first virtual machine is different from location information of the first virtual machine in the MAC routing table of the second gateway and when the serial number in the first location update message is the same as a serial number of the first virtual machine saved in the second gateway; and
   learning, by the second gateway, from the first virtual machine to obtain current location information of the first virtual machine when the second gateway receives a packet destined for the first vi machine and the second gateway does not save the MAC route of the first virtual machine.

2. The method of claim 1, further comprising:
   updating a serial number of a second virtual machine saved in the second gateway when the second gateway detects that the second virtual machine is migrated from a third data center to the second data center; and
   sending, by the second gateway, a second location update message comprising the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when a conflict exists between the location information of the second virtual machine.

3. The method of claim 2, wherein after the second gateway detects that the second virtual machine is migrated from the third data center to the second data center, the method further comprises updating, to an interface of the second gateway by the second gateway, an outbound interface of the second virtual machine in the MAC routing table saved in the second gateway, wherein updating the serial number of the second virtual machine saved in the second gateway comprises updating, by the second gateway, a Border Gateway Protocol (BGP) entry of the second virtual machine saved in the second gateway, and wherein the BGP entry of the second virtual machine comprises the serial number of the second virtual machine.

4. The method of claim 3, wherein updating, to the interface of the second gateway by the second gateway, the outbound interface of the second virtual machine in the MAC routing table saved in the second gateway comprises:
   deleting, by the second gateway, an entry corresponding to the second virtual machine and in a network side MAC routing table when the second gateway stores the network side MAC routing table and an access side MAC routing table; and
   adding, to the access side MAC routing table, an entry indicating that the outbound interface of the second virtual machine is the interface of the second gateway.

5. The method of claim 3, wherein updating, to the interface of the second gateway by the second gateway, the outbound interface of the second virtual machine in the MAC routing table saved in the second gateway comprises changing, by the second gateway, the outbound interface of the second virtual machine in the MAC routing table from a network side outbound interface to the interface of the second gateway when the second gateway stores only one MAC routing table.

6. A gateway, wherein the gateway is a second gateway of a second data center, and wherein the gateway comprises:
   a memory comprising instructions; and
   a processor coupled to the memory, wherein the instructions cause the processor to be configured to:
      receive a first location update message from a first gateway of a first data center, wherein the first location update message is sent by the first gate ray when detecting that a first virtual machine is migrated to the first data center in a cross-data center manner, wherein the first location update message notifies that location information of the first virtual machine is changed, and wherein the first location update message comprises the location information of the first virtual machine and a serial number indicating a quantity of times of migration of the first virtual machine;
      determine that a conflict exists between the location information of the first virtual machine in the first location update message and location information of the first virtual machine in a media access control (MAC) routing table of the second gateway when the location information of the first virtual machine is different from the location information of the first virtual machine in the MAC routing table of the second gateway and when the serial number in the first location update message is the same as a serial number of the first virtual machine saved in the second gateway;
      delete, according to the first location update message, a MAC route of the first virtual machine saved in the second gateway; and
      learn from the first virtual machine to obtain current location information of the first virtual machine when a packet destined for the first virtual machine is received and the second gateway does not save the MAC route of the first virtual machine.

7. The gateway of claim 6, wherein the instructions further cause the processor to be configured to:
   update a serial number of a second virtual machine saved in the second gateway when detecting that the second virtual machine is migrated from a third data center to the second data center; and
   send a second location update message comprising the serial number of the second virtual machine to a gateway of another data center than the second data center such that after receiving the second location update message, the gateway of the other data center than the second data center learns that location information of the second virtual machine is changed, and deletes a MAC route of the second virtual machine saved in the gateway of the other data center when a conflict exists between the location information of the second virtual machine.

8. The gateway of claim 7, wherein the instructions further cause the processor to be configured to:
update, to an interface of the second gateway, an outbound interface of the second virtual machine in the MAC routing table saved in the second gateway; and
update a Border Gateway Protocol (BGP) entry of the second virtual machine saved in the second gateway, wherein the BGP entry of the second virtual machine comprises the serial number of the second virtual machine.

9. The gateway of claim 8, wherein when the second gateway stores a network side MAC routing table and an access side MAC routing table, the instructions further cause the processor to be configured to:
delete an entry corresponding to the second virtual machine and in the network side MAC routing table; and
add, to the access side MAC routing table, an entry indicating that the outbound interface of the second virtual machine is the interface of the second gateway.

10. The gateway of claim 8, wherein the instructions further cause the processor to be configured to change the outbound interface of the second virtual machine in the MAC routing table from a network side outbound interface to the interface of the second gateway when the second gateway stores only one MAC routing table.

11. A network system, comprising:
a first data center comprising:
a first virtual machine; and
a first gateway coupled to the first virtual machine and configured to
send, to a gateway of another data center in the network system, a first location update message notifying that location information of the first virtual machine is changed;
update a serial number of the first virtual machine saved in the first gateway when detecting that the first virtual machine is migrated to the first data center in a cross-data center manner; and
send the first location update message to the gateway of the other data center, wherein the first location update message comprises the location information of the first virtual machine and a serial number indicating a quantity of times of migration of the first virtual machine, and a second data center coupled to the first data center and comprising:
at least one virtual machine; and
a second gateway coupled to the at least one virtual machine and configured to:
receive the first location update message from the first gateway;
determine that a conflict exists between the location information of the first virtual machine in the first location update message and the location information of the first virtual machine in a media access control (MAC) routing table of the second gateway;
delete, according to the first location update message, a MAC route of the first virtual machine saved in the second gateway when the location information of the first virtual machine is different from the location information of the first virtual machine in the MAC raging table of the second gateway and when the serial number in the first location update message is the same as a serial number of the first virtual machine saved in the second gateway; and
learn from the first virtual machine to obtain current location information of the first virtual machine when a packet destined for the first virtual machine is received and the second gateway does not save the MAC route of the first virtual machine.

12. The network system of claim 11, wherein the first gateway is further configured to:
update an outbound interface of the first virtual machine in a MAC routing table saved in the first gateway to an interface of the first gateway; and
update a Border Gateway Protocol (BGP) entry of the first virtual machine saved in the first gateway, wherein the BGP entry of the first virtual machine comprises the serial number of the first virtual machine.

13. The network system of claim 12, wherein when the first gateway stores a network side MAC routing table and an access side MAC routing table, the first gateway is further configured to:
delete an entry corresponding to the first virtual machine and in the network side MAC routing table; and
add, to the access side MAC routing table, an entry indicating that the outbound interface of the first virtual machine is the interface of the first gateway.

14. The network system of claim 12, wherein the first gateway is further configured to change the outbound interface of the first virtual machine in the MAC routing table from a network side outbound interface to the interface of the first gateway when the first gateway stores only one MAC routing table.

* * * * *

UNITED STATES PATENT AND TRADEMARK OFFICE
CERTIFICATE OF CORRECTION

PATENT NO. : 10,361,992 B2
APPLICATION NO. : 15/606859
DATED : July 23, 2019
INVENTOR(S) : Wenbin Ju, Daolong Zhou and Lingling Ji It is certified that error appears in the above-identified patent and that said Letters Patent is hereby corrected as shown below:

In the Claims

Claim 1, Column 19, Line 36: should read "first virtual machine"

Claim 6, Column 20, Line 29: should read "the first gateway"

Claim 11, Column 22, Line 19: should read "the MAC routing table"

Signed and Sealed this
Tenth Day of September, 2019

Andrei Iancu
*Director of the United States Patent and Trademark Office*